United States Patent Office 2,722,542
Patented Nov. 1, 1955

2,722,542

PRODUCTION OF ENOL ETHERS OF ALPHA-FORMYL ESTERS

Dean R. Rexford, Princeton, N. J., assignor to Research Corporation, New York, N. Y., a corporation of New York No Drawing. Application December 30, 1952, Serial No. 328,800

4 Claims. (Cl. 260—484)

This invention relates to a new and improved process for the production of enol ethers of alpha-formyl esters.

It has been found that by treating a solution of a substituted dihalomethyl malonic ester of the general formula

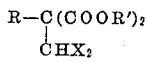

wherein R represents an alkyl, alicyclic, aryl, arylalkyl or heterocyclic group which may be substituted with groups unreactive with alkali metal alkoxides, R' represents a lower alkyl group, and X represents chlorine or bromine, in an inert solvent such as a lower alkyl ether or an aromatic hydrocarbon, with an alkali metal lower alkoxide, the corresponding enol ethers of alpha-formyl esters of the general formula

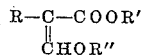

wherein R'' represents a lower alkyl group which may be the same as or different from R', are readily formed in good yield. The reaction is accelerated by heating and is preferably carried out at the reflux temperature of the solvent, the time of substantial completion then varying inversely with the boiling point of the solvent.

The enol ethers may be converted to aldehydes by hydrolysis and decarboxylation, for example, by heating with acetic acid, or they may be utilized in the preparation of pyrazolones by reacting them with hydrazines.

The method of the invention makes possible the conversion of alkyl or aralkyl halides to aldehydes containing two more carbon atoms than the original halide by the series of reactions illustrated by the following equations in which Equation 3 represents the method of the invention:

(1)   $RX + CH_2(COOR')_2 \longrightarrow R-CH(COOR')_2$ (2)   $R-CH(COOR')_2 + HCX_3 \longrightarrow R-C(COOR')_2$
$\phantom{R-CH(COOR')_2 + HCX_3 \longrightarrow R-}|$
$\phantom{R-CH(COOR')_2 + HCX_3 \longrightarrow R-}CHX_2$

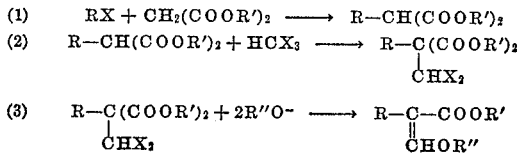

(4)   $R-C-COOR' \xrightarrow{H_2O} R-CH_2-CHO + CO_2$
$\phantom{(4)\ \ \ R-}\|$
$\phantom{(4)\ \ \ R-}CHOR''$ The following is a representative example of the method of the invention as applied to the preparation of ethyl α-ethoxymethylidenecaproate,

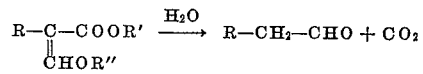

Sodium is dissolved in a convenient amount of absolute ethanol. To the solution is added an amount of absolute mixed xylenes such that on removal of excess ethanol, there will be about two moles of sodium ethoxide per liter of xylene. The mixture is distilled until the temperature at the head of a simple fractionating column is that of boiling xylene. An amount of diethyl n-butyldichloromethylmalonate corresponding in moles to one-half the number of atoms of sodium used is added and the mixture refluxed until it is neutral or nearly so. This requires about fifteen minutes.

To isolate the enol-ether, the reaction mixture is poured into ice-cold sulphuric acid acidulated water and the xylene layer separated and dried. Distillation of the xylene mixture under reduced pressure yields the pure ethyl α-ethoxymethylidenecaproate in theoretical yield. B. P.$_{20}$ 129–131° C., $n_D^{25}$ 1.448.

In the specific example, R is a normal butyl group. In its place may be other alkyl groups of any configuration and number of carbon atoms, such as n-C$_{12}$H$_{25}$, alicyclic groups, such as cyclohexyl, arylalkyl groups, such as benzyl, aryl groups, such as phenyl or naphthyl, or heterocyclic groups, such as pyridyl. These groups may be substituted with any groups, such as alkoxy groups, which do not react with alkali metal alkoxides.

I claim:

1. A method of making enol ethers of alpha formyl esters which comprises heating a substituted dihalomethylmalonic ester of the formula

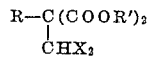

wherein R is selected from the group consisting of alkyl, alicyclic, aryl, arylalkyl, and heterocyclic groups, R' represents a lower alkyl group and X represents halogen, with an alkali metal lower alkoxide in an inert solvent until the corresponding enol ether of the formula

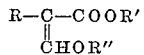

wherein R'' represents a lower alkyl group, is formed.

2. A method as defined in claim 1 wherein the inert solvent is a monocyclic aromatic hydrocarbon.

3. The method as defined in claim 1 wherein R is an organic hydrocarbon group.

4. The method as defined in claim 1 wherein R is an alkyl group.

No references cited.